United States Patent [19]

Nanba et al.

[11] Patent Number: 4,680,634
[45] Date of Patent: Jul. 14, 1987

[54] SYSTEM FOR PROCESSING PICTURE INFORMATION

[75] Inventors: Keiichiro Nanba; Satoru Tokui; Tatsuro Onuma, all of Tokyo, Japan

[73] Assignee: Pioneer Electronic Corporation, Tokyo, Japan

[21] Appl. No.: 662,560

[22] Filed: Oct. 19, 1984

[30] Foreign Application Priority Data

Oct. 21, 1983 [JP] Japan .................. 58-197455

[51] Int. Cl.⁴ .............................................. H04N 5/268
[52] U.S. Cl. ...................... 358/181; 358/903; 340/825.5
[58] Field of Search .............. 358/181, 903, 183, 83, 358/185, 188; 340/794, 825.01, 825.03, 825.04, 825.22, 825.5, 825.51

[56] References Cited

U.S. PATENT DOCUMENTS

| | | | |
|---|---|---|---|
| 4,148,070 | 4/1979 | Taylor | 358/903 |
| 4,425,581 | 1/1984 | Schweppe | 358/183 |
| 4,515,764 | 4/1985 | Borg | 358/181 |
| 4,521,810 | 6/1985 | Nigborowicz | 358/181 |

FOREIGN PATENT DOCUMENTS

| | | | |
|---|---|---|---|
| 52678 | 4/1980 | Japan | 358/181 |
| 178677 | 10/1983 | Japan | 358/181 |
| 188976 | 11/1983 | Japan | 358/181 |

Primary Examiner—Tommy P. Chin
Attorney, Agent, or Firm—Schwartz, Jeffery, Schwaab, Mack, Blumenthal & Evans

[57] ABSTRACT

A system for processing picture information adapted for combining or switching picture informations, one of which is obtained by a process of a Central Processing Unit and another of which is supplied from an external appliance. The system includes a device for detecting the presence of second picture information and informing the Central Processing Unit of same. The Central Processing Unit is controlled to perform the selection between two types of picture information in accordance with the operation of the detecting and informing device. The combination or selection between two types of picture information is thus performed by a software for operating the Central Processing Unit.

3 Claims, 2 Drawing Figures

SYSTEM FOR PROCESSING PICTURE INFORMATION

BACKGROUND OF THE INVENTION

1. Field of the Invention

The present invention relates to a system for processing picture information, and more particularly to a system which controls the operation of combining or switching-over picture information obtained by the operating process of a central processing unit (referred to as CPU hereinafter) and external picture information such as a television picture signal supplied from an external appliance.

2. Description of Background Information

Generally, systems of this sort are made by the hardware oriented technique, that is, to use a switching-over circuit for combining or switching-over the picture information. Therefore, when the system utilzes the CPU, such an operation of combining or switching-over the picture information is performed independently of a software for operating the CPU, and the capability of the CPU is not sufficiently utilized.

SUMMARY OF THE INVENTION

An object of the present invention is therefore to provide a system for processing picture information which is capable of processing the picture information by the software of the CPU so as to effectively use the capability of the CPU.

According to the present invention, the system for processing the picture information is adapted to treat a first picture information processed by a CPU and a second picture information provided from outside. Means is provided for detecting the presence or absence of the second picture information and informing the CPU of same. The system is constructed so that the CPU derives at least the second picture information when it is present and derives the first picture information when the second picture information is not present, in response to the above informing process.

Further scope and applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

DETAILED DESCRIPTION OF A PREFERRED EMBODIMENT

The preferred embodiment of the invention will be described hereinafter with reference to the accompanying drawings.

Figure 1:
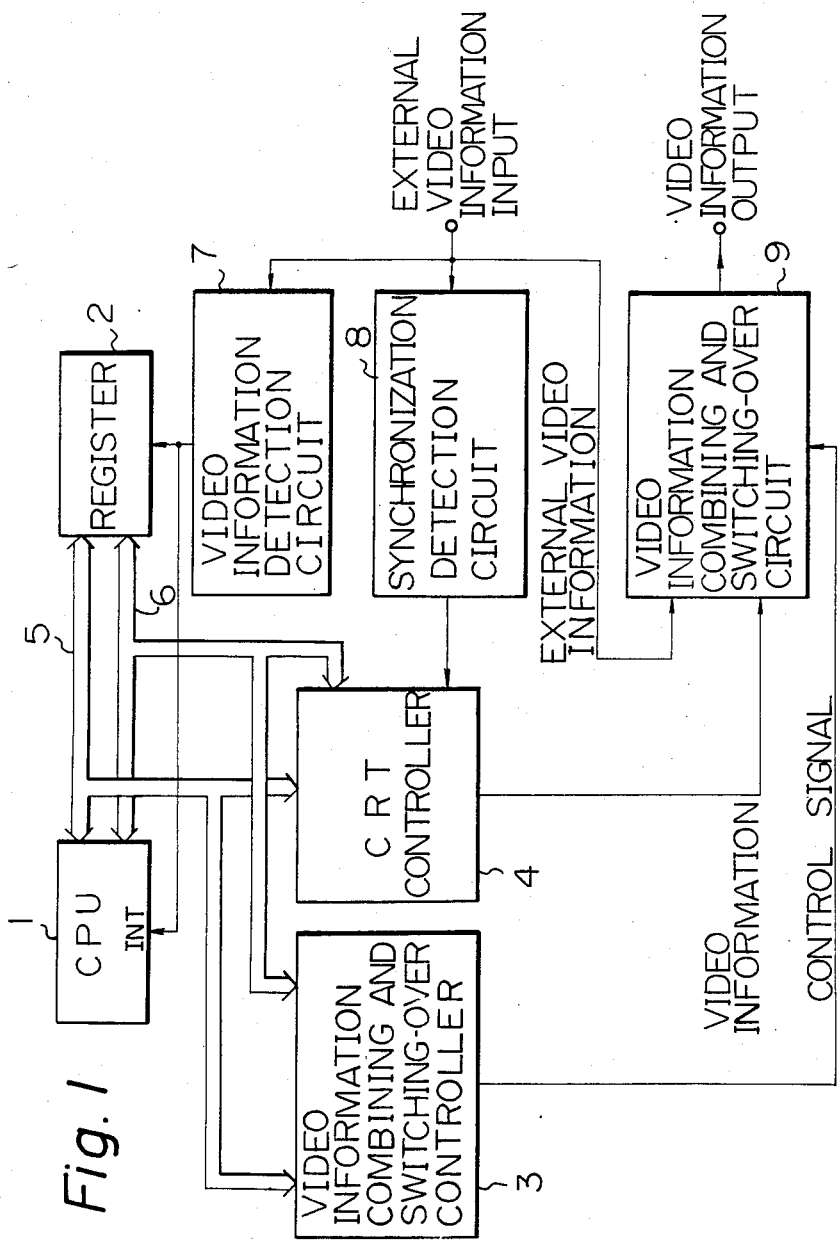
FIG. 1 is a block diagram of an embodiment of the system for processing the picture information according to the present invention.

As shown in the block diagram of FIG. 1, the system includes a CPU 1, a register 2, a video combining and switching-over controller 3, a CRT (cathode ray tube) controller 4, a data bus 5 and an address bus for the connection between the above elements. The external video signal is applied to an external video information detection circuit 7, a synchronization detection circuit 8, a video imformation combining and switching-over circuit 9 respectively. An output signal of the video information detection circuit 7 is supplied to the register 2 and to an interrupt terminal of the CPU 1. The synchronization signal from the synchronization detection circuit 8 is then applied to the CRT controller 4. A video information processed in CPU 1 and supplied to the CRT controller 4. The video information though the CRT controller 4 and the external video information are combined or alternatively selected in the combining and switching-over circuit 9. The manner of deriving both of the informations is controlled in accordance with a control signal from the controller 3.

The operation of the system constructed as above is performed in the following manner. When the external video information is not present, the system is operated so that the video information processed in the CPU 1 is derived as the video information output signal. On the other hand, if the external video information arrives, it is detected by the video information detection circuit 7, and a detection signal indicative of the presence of the external video information is latched in the register 2. At the same time, the video information from the CRT controller 4 is synchronized to the external video information by means of the synchronizing signal applied from the synchronization detection circuit 8.

The CPU 1 reads out the contents of the register 2 which indicate the presence of the external video information. Therefore, the CPU commands the controller 3 to start the control of the combination of both informations or the selection of the external video information. Thus, the combined signal of both informations or the selected signal of the external video information will be derived.

In the case of the other method, the video detection signal is applied to an interrupt terminal of the CPU 1 such as shown in FIG. 1. With this construction, when the external video information is supplied, the operation of the CPU is interrupted and in turn the above mentioned combination or selection operation will be performed. Also, the system can be constructed such that the CPU is interrupted by the timing of the extinction of the external video information, when the external video information disappears. With the thus constructed system, the CPU produces the command of internal synchronization mode to the controller 3 and also the command of the cancellation of the combination of both informations or the cancellation of the selection of the external information.

Figure 2:
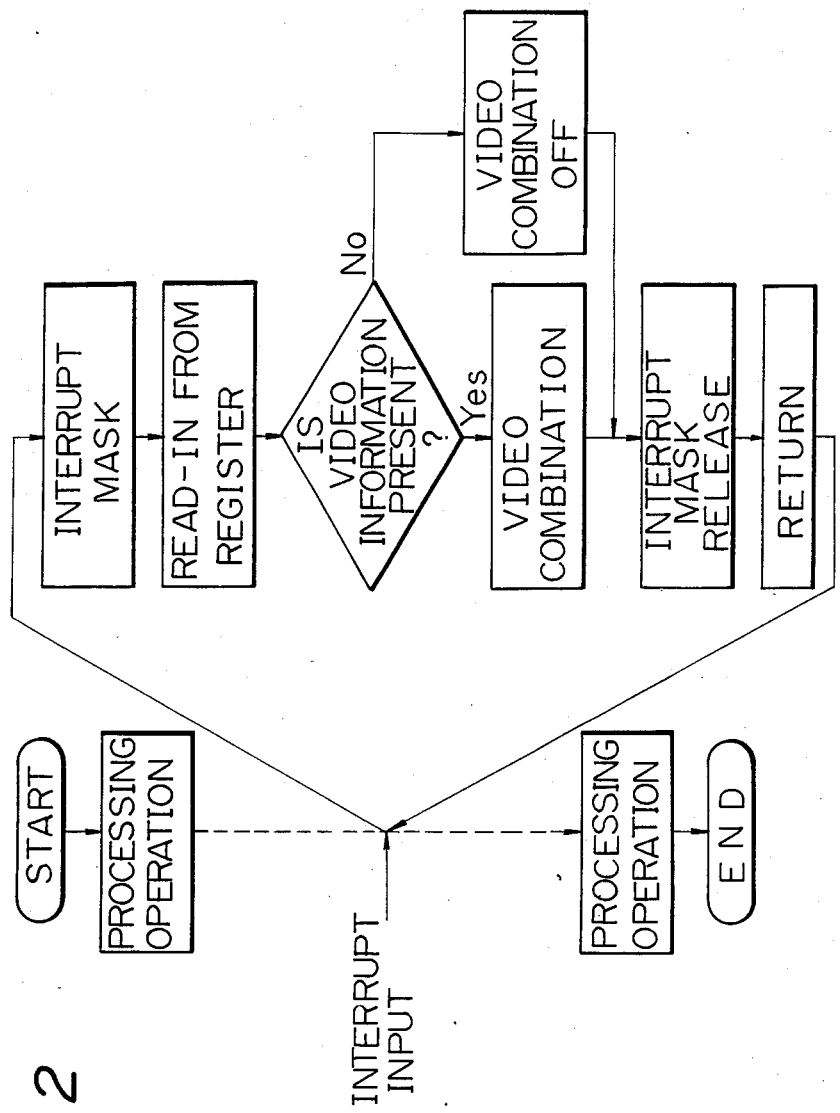
FIG. 2 is a flowchart showing the operation of the system for processing the picture information is illustrated in FIG. 1.

FIG. 2 is the flowchart showing the above interruption operation. As shown, even with the external video information applied during the normal processing operation of the CPU 1, it is not necessary for the CPU 1 to monitor the presence or the absence of the video information, by providing the software for the processing of the external video information in an interruption processing routine.

Thus, according to the present invention, the CPU can be always informed of the presence or absence of the external video informtion according to the content of the register. Therefore, the calculated video information and the external video information are appropriately combined or switched-over in accordance with the presence or the absence of the external video information. Further, lowering of the CPU's capacity of operation can be prevented by preparing the software for the above combination or switching-over operation as a routine for treating an interruption.

Preferred embodiments of the present invention have been described so far. It should be understood, however, that the foregoing description has been for illustrative purpose only, and it is not intended to limit the scope of the invention. Rather, there are numerous equivalents to the preferred embodiments, and such are intended to be covered by the appended claims. As an example, though the system is so constructed that the mode of external synchronization is selected when the synchronization signal of the external video information is applied to the controller 4, it is possible to design the system such that one of the mode of internal synchronization and the mode of external synchronization is selected by the control operation of the CPU 1. In that case, the desired synchronization mode is established in accordance with the contents of the register 2.

What is claimed is:

1. A system for processing a picture information signal generated by a picture information signal generation operation and an external video signal supplied from an external video source, comprising:
 a central processing unit for executing programs including a program for generating said picture information signal;
 input means for receiving said external video signal;
 external video signal detection means connected to said input means, for generating a detection signal when said external video signal is present at said input means;
 register means connected to said central processing unit and said external video signal detection means for temporarily storing said detection signal from said external video signal detection means;
 control means connected to said central processing unit and responsive to said detection signal for generating a control signal; and
 output means receiving said picture information signal and said external video signal and responsive to said control signal, for supplying at least said external video signal to an output thereof and in response to the absence of said control signal for selectively supplying said picture information signal to said output whereby said central processing unit selectively controls said output means
 wherein said central processing unit comprises:
 an interrupt terminal for receiving said detection signal;
 said central processing unit operable for reading a content of said register means for operating said control means to supply said control signal to said output means so that said picture information signal and said external video signal are combined at said output means when said detection signal is present in said register means, and operating said control means to stop said control signal so that said picture information signal is output from said output means when said detection signal is not present in said register means.

2. A system as set forth in cliam 1, further comprising:
 synchronizing signal detection means connected to said input means for detecting a synchronizing signal of said external video signal; and
 synchronization control means responsive to said synchronizing signal and inserted between said central processing unit and said output means, for controlling a synchronization of said picture information signal by means of said synchronizing signal.

3. A system as set forth in claim 1, wherein said output means includes means responsive to said control signal for combining said picture information signal and said external video signal.

* * * * *